United States Patent Office 3,801,601
Patented Apr. 2, 1974

1

3,801,601
2-ACYLAMIDO - 2 - (3,4-METHYLENEDIOXY-
BENZYL) - 3 - HYDROXY-PROPIONITRILE
COMPOUNDS
Donald F. Reinhold and Meyer Sletzinger, North Plain-
field, and Raymond A. Firestone, Fanwood, N.J., as-
signors to Merck & Co., Inc., Rahway, N.J.
No Drawing. Division of application Ser. No. 829,129,
May 29, 1968, which is a division of application Ser.
No. 675,729, Sept. 7, 1967, now abandoned, which in
turn is a division of application Ser. No. 350,111, Mar.
6, 1964, now Patent No. 3,395,176. This application
Oct. 27, 1971, Ser. No. 193,179
Int. Cl. C07d *13/10*
U.S. Cl. 260—340.5                              1 Claim

ABSTRACT OF THE DISCLOSURE

The invention comprises compounds of the formula

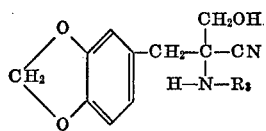

in which $R_3$ is selected from the group consisting of acetyl and formyl.

---

This application is a division of U.S. Ser. No. 829,129, filed May 29, 1969 which application is a division of U.S. Ser. No. 675,729, filed Sept. 7, 1967 (now abandoned) which application is a division of U.S. Ser. No. 350,111, filed Mar. 6, 1964 (now U.S. Pat. 3,395,176).

This invention relates to new amino acids. More partic- ularly, it relates to new phenylalanine type compounds. Still more particularly, it relates to compounds of the formula

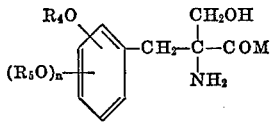

in which $R_4$ and $R_5$ may be hydrogen, lower alkyl or when $R_4$ and $R_5$ are ortho to each other and taken together, methylene;
M may be lower alkoxy, $NH_2$ or hydroxy;
n may be 0, 1, or 2;

and to acid addition salts thereof and to intermediates in the preparation thereof.

We have found the alanine compounds of the class described above are active as inhibitors of mammalian decarboxylase. In addition, we have also found these compounds to be very valuable anti-hypertensive agents usable in cases of malignant hypertension.

In their use in vivo, these amino acids may be given orally or parenterally. Dosages for oral administration will vary from 10 to 500 milligrams per kilo per day. For oral administration to humans, the dosage range is 0.1 to 5.0 grams per day, preferably, 0.5 to 1.5 grams per day, usually in frequent, small doses.

2

The compounds of our invention can be mixed with any convenient ingredient for tablets. They may be also given parenterally and can be mixed with any of the conventional materials and carries used in compositions for that method of application. They may also be mixed with any other anti-hypertensive agent in combination.

These compounds can also be utilized as intermediates in the preparation of norepinephrine-like compounds. Such compounds can be prepared by decarboxylation of the amino acid followed by hydroxylation on the β-carbon of the resulting amine. The decarboxylation can be carried out by the use of an enzyme catalyst (e.g., mammalian decarboxylase is readily obtainable by evaporation of the aqueous extract of ground hog or beef kidney or liver). The amino acid is heated at 37° C. with the enzyme and the coenzyme pyridoxylphosphate in an aqueous medium, buffered at a pH of 6.8, to give the corresponding amine. Hydroxylation of the β-carbon can be achieved by sev- eral routes. One is an enzymatic conversion by heating in a pH 6.8 buffered aqueous medium in the presence of slices of mammalian liver (beef or hog, e.g.). Such a method is shown by Senoh et al., J. Am. Soc., 81 6236 (1959). Another is by the chemical method of Senoh and Withop, J. Am. Chem. Soc. 81 622 (1959). The resulting products are related to norepinephrine in the same way that the amino acids are related to dihydroxyphenyl- alanine. Compounds of the structure of the norepinephrine type are known to have utility as pressor agents and the alanine compounds of this invention are thus also valu- able intermediates in the preparation of such compounds.

In accordance with this invention as shown in Flow Sheet II, a substituted benzyl halide and an α-acetamido- cyano-acetic acid ester are condensed to produce a 2-acetamido-2-(substituted-benzyl)-cyanoacetic acid ester. Upon reduction with a borohydride, this ester is con- verted to 2-acetamido-2-(substituted-benzyl)-3-hydroxy- propionitrile. When the substituents on the benzyl radical are dihydroxy and ortho to each other, a borate com- plex is formed during the reduction. The propionitrile is then hydrolyzed and dealkylated in concentrated acid to the α-hydroxymethylhydroxy - substituted - phenylalanine hydrohalide. Alternatively, the propionitrile may be first hydrolyzed with dilute acid to form 2-hydroxymethyl- substituted-phenyl-alanine amide hydrohalide, then fur- ther hydrolyzed to the acid, and still further converted to the hydroxy substituted alanine compounds by further treatment with strong acid. The esters of these acids may then be prepared by treating the alanine compound with an alcoholic solution of a hydrohalic acid. In a similar fashion, the borate complex previously mentioned may be hydrolyzed to the ortho-dihydroxy alanine compound. In those cases where the substituent is methylenedioxy, this group will remain throughout the sequences of steps in the process to yield the final α-hydroxymethyl-methyl- enedioxyphenylalanine or ester. All the alanine hydro- halide compounds thus formed may be ultimately con- verted to the free alanine compound by reaction with a lower alkylene oxide or by cautious neutralization. The free alanine compound may be converted back to an acid addition salt by treatment with an inorganic acid or organic acid such as citric or acetic acid. These acid salts are equivalent in usage to the free acids.

The substituted benzyl halide starting material may be prepared (see Flow Sheet I) by reducing a correspond- ing substituted benzaldehyde (obtained from British Pat.

936,074) to the corresponding alcohol, which in turn is converted to the substituted benzyl halide by treatment with a concentrated solution of a hydrohalic acid.

The starting materials in the process of this invention may contain any lower alkoxy substituent in the benzyl halide, such as methoxy, ethoxy, propoxy, and the like, as well as hydroxy or methylenedioxy (methoxy and hydroxy preferred, but especially methoxy). The halide of this benzyl starting material may be chloride or bromide, preferably chloride. The α-acetamido cyanoacetic acid ester starting material may have any lower alkyl (such as methygl, ethyl, propyl and the like) or ar-lower alkyl such as phenylethyl and phenylpropyl as the ester group; however, a lower alkyl ester is preferred, especially the ethyl ester. The substituted amide portion of the molecule may be formamido or acetamido. In the preferred process, for preparing the preferred novel compounds, the starting materials are 3,4-dimethoxybenzyl chloride and ethyl-2-acetamido-cyanoacetate. The preferred novel compounds thus prepared are as follows:

ethyl-2-acetamido-2-(3,4-dimethoxybenzyl)cyanoacetate,
2-acetamido-2-(3,4-dimethoxybenzyl)-3-hydroxypropionitrile,
α-hydroxymethyl-3,4-dimethoxyphenylalanine·HCl,
α-hydroxymethyl-3,4-dihydroxyphenylalanine·HBr,
α-hydroxymethyl-3,4-dihydroxyphenylalanine, and
α-hydroxymethyl-3,4-dihydroxyphenylalanine ethyl ester.

FLOW SHEET I

Preparation of starting materials

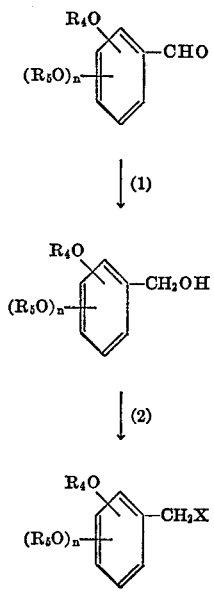

Equivalents:
$R_4$ and $R_5$=hydrogen, lower alkyl (such as methyl, propyl, pentyl and the like), or when $R_4$ and $R_5$ are ortho to each other and taken together, methylene.
n=0, 1, 2.
X=bromide or chloride.

Reactions and conditions:
(1) Reduction by direct addition of hydrogen in an inert solvent in the presence of a platinum catalyst.
(2) Reaction with a 50% mixture of ether and concentrated hydrobromic acid (or hydrochloric acid) at room temperature for 3 hours.

FLOW SHEET II

Preparation of the compounds of our invention

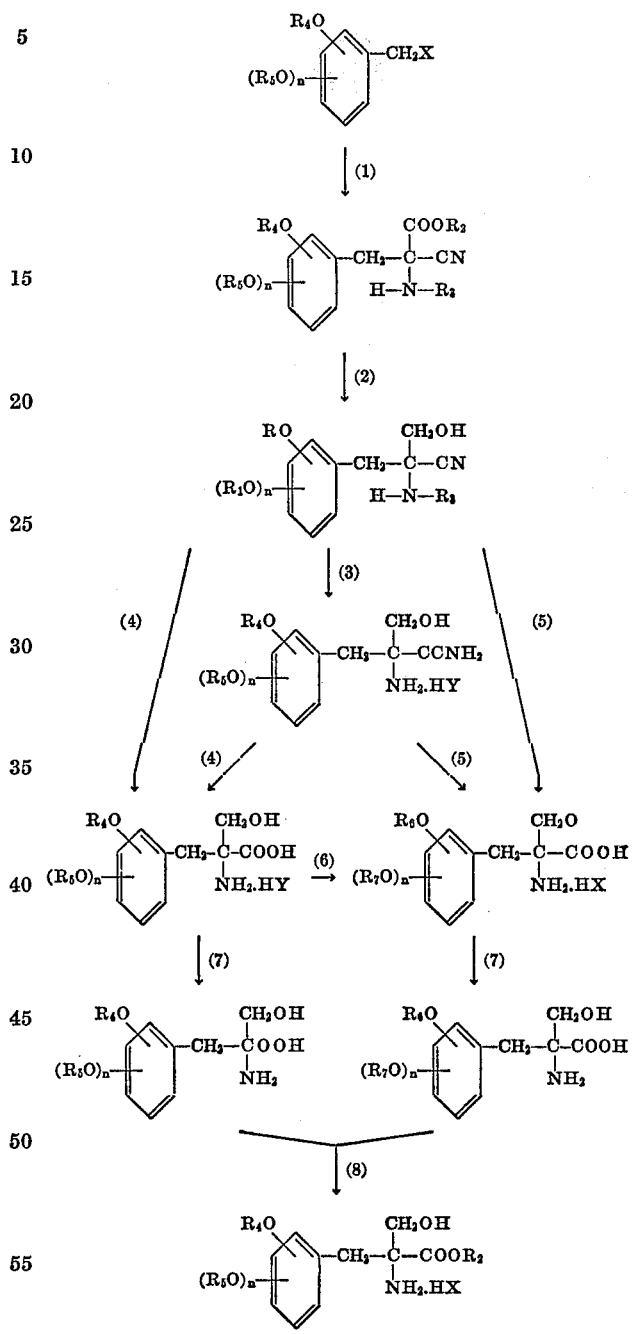

Equivalents:
R and $R_1$=hydrogen, lower alkyl (no more than one of R and $R_1$ being ortho to each other and hydrogen) or when ortho to each other and taken together R and $R_1$ are methylene or a borate complex (where $R_4$ and $R_5$ were hydrogen). The lower alkyl may be methyl, ethyl, propyl, pentyl and the like (preferably methyl).
$R_2$=lower alkyl (such as methyl, propyl, pentyl and the like) or ar-loweralkyl (such as phenylethyl and the like, preferably lower alkyl, especially ethyl).
$R_3$=acety or formyl.
$R_4$ and $R_5$=hydrogen, lower alkyl (such as methyl, ethyl, propyl, pentyl and the like, preferably methyl) or when $R_4$ and $R_5$ are ortho to each other and taken together, methylene.

$R_6$ and $R_7$=hydrogen or when ortho to each other and taken together are methylene.

X=bromine or chlorine.

Y=inorganic acid anion selected from a non-oxidizing inorganic acid such as Cl, Br, $SO_4$, $PO_4$ and the like.

Reactions and Conditions:

(1) Reaction with sodium hydride and a cyanoacetate

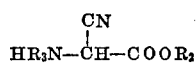

preferably 1–2 moles of sodium hydride (especially equimolar ratios of each), with or without a solvent, but preferably a polar non-hydroxylic solvent such as dioxane, dimethylformamide, diethyleneglycol, dimethylether, dimethylsulfoxide, aromatic solvents and the like, especially dimethylformamide, at any suitable temperature (−5° C. to 40° C., preferably below 37° C.), but especially ambient temperatures until the reaction is substantially complete.

(2) Reaction with an alkali metal borohydride such as borohydride, sodium borohydride and potassium borohydride, preferably 1–2 moles of lithium borohydride (especially 1–1.2 moles) in a solvent thereof such as lower alkyl alcohols, tetrahydrofuran, ether and the like (preferably lower alkyl alcohols or tetrahydrofuran) especially THF at any suitable temperature (50–100° C.) (preferably at or near the reflux temperature of the solvent) until the reaction is substantially complete.

(3) Reaction of the nitrile at any suitable temperature in an alcoholic mineral acid for a short time, concentration of the solution in vacuo (to remove the mineral acid and solvent), addition of water and reaction for an additional short time at a suitable temperature. The alcohol used my be a lower alkanol such as methanol, ethanol, butanol and the like or ar-lower alkanol such as benzyl alcohol, phenylethanol and the like, preferably a lower alkanol, but especially methanol. The acid used may be 1–4 normal hydrochloric acid, sulfuric acid, phosphoric acid and the like, preferably 2–3 normal hydrochloric acid; equimolar ratios of reactants and acid can be used as well as an excess of acid; it is preferred, however, to use a slight excess, 1.1 moles of acid. The reaction time in both cases above should be at least 10 minutes, but preferably 15–30 minutes. The first reaction is preferably run at ambient temperatures, whereas the second reaction may be run at 0° C. to the reflux temperature of the system, preferably 35° C. to reflux, especially at or near reflux.

(4) Reaction with a dilute solution of mineral acid at any suitable temperature until the reaction is substantially complete: The excess mineral acid (1–3 normal, preferably 1.5–2.5 normal) may be hydrohalic acids (hydrobromic acid and hydrochloric acid), phosphoric acid, sulfuric acid, polyphosphoric acid and the like; hydrohalic acids are preferred, especially an excess (2–3 moles) of hydrochloric acid. The reaction may be conveniently run between 10 and reflux, preferably room temperature to reflux, and especially at or near the reflux temperature of the system.

(5) Reaction with an excess of a concentrated aqueous hydrohalic acid (above 6 N) such as hydrochloric acid or hydrobromic acid (preferably constant boiling 48% hydrobromic acid), at a temperature of 75–126° C., preferably over 100° C. but especially at or near the reflux temperature of the system until the hydrolysis and cleavage is substantially complete.

(6) Reaction with an excess of a concentrated aqueous hydrohalic acid, such as hydrochloric acid or hydrobromic acid (preferably above 20% hydrochloric acid) at the reflux temperature of the system until the cleavage is substantially complete, but especially 30–35% aqueous hydrochloric acid in a sealed vessel at 145–160° C. until the cleavage is substantially complete.

(7) Reaction with a lower alkylene oxide or an inorganic base in an inert solvent at any suitable temperature until the reaction is substantially complete: The lower alkylene oxide may be ethylene oxide, propylene oxide, butylene oxide and the like. The inorganic base may be sodium bicarbonate, sodium hydroxide, sodium carbonate, potassium carbonate, potassium hydroxide, potassium bicarbonate, and the like, preferably a lower alkylene oxide and especially propylene oxide. The inert solvent (inert to the reaction) may be lower ketones (acetone, butyl ketone, pentyl ketone, and the like), ethers (diethyl ether, ethylmethyl ether, dipropyl ether and the like), and lower alkanols (ethanol, methanol, propanol and the like), preferably acetone or sec-butanol, but especially acetone. In the case of neutralization, aqueous solvents are used. The temperature may vary from 0–35°, preferably 15–25°, but especially ambient temperatures.

(8) Reaction in an excess of a lower alkanol or an ar-lower alkanol in the presence of a mineral acid at an elevated temperature until the reaction is substantially complete: The lower alkanol may be methanol, ethanol, butanol and the like and ar-lower alkanol may be benzyl alcohol, pnenyl propanol and the like, preferably ethanol or benzyl alcohol, but especially ethanol. The mineral acid may be hydrohalic acids (hydrochloric acid or hydrobromic acid), sulfuric acid, phosphoric acid and the like, preferably a catalytic amount of concentrated sulfuric acid or gaseous hydrochloric acid, especially a catalytic amount of concentrated sulfuric acid. The elevated temperature may vary from 35° to the reflux temperature of the system, preferably above 55°, but especially at or near the reflux temperature of the solvent.

Although it is preferred to use approximately equimolar ratios of reactants in reaction (1), an additional quantity of sodium hydride is normally used in cases where the substituents of the starting material contains a free hydroxyl. Since the free hydroxyls consume sodium hydride, this excess is needed if it is desired to maintain the equimolar ratios of reactions. Although it is not necessary to remove the solvents from reaction (1) before continuing to reaction (2), this procedure is desirable so as to obtain a cleaner reaction in reaction (2). Accordingly, the solvent of reaction (1) may be removed in vacuo and the residue dissolved in a polar organic solvent not miscible with water, such as n-butanol, ethyl acetate or chloroform (preferably ethyl acetate), washed with water, dried over $MgSO_4$ and the solvent distilled.

In reaction (2) when the starting material is the ortho-dihydroxy compound, the borate complex is formed. After reaction (2) is completed, the excess borate present may be removed by removing the THF, adding $H_2O$, neutralizing and extracting with ethyl acetate.

In reactions (4) and (5), the extent of hydrolysis to the acid and dealkylation of the benzyl substituent obtained in each reaction is determined by the acid used, the concentration of the acid, and the temperature, as well as the time of reaction. Where in reactions (4) and (5) the amide is the starting material, it is to be observed that less acid is needed. When the substituents on the aromatic ring of the final compound are to be hydroxy, procedure (3) is followed using the benzyloxy substituent where the hydroxy is ultimately desired. The benzyloxy substitutedphenylalanine amide obtained is then reduced by the addition of palladium on charcoal and hydrogen, to yield the hydroxy substituted phenylalanine amide compound. As indicated in the flow sheet, the nitrile may be first converted to the amide, which may then be hydrolyzed or hydrolyzed and dealkylated, or the amino acid may be prepared directly from the nitrile.

In cases where hydrolysis to the acid as well as dealkylation is desired, constant boiling hydrochloric acid or 48% hydrobromic acid at elevated temperatures may be used. Normally, to obtain dealkylation as well as hydrolysis, it is preferred to use either 48% hydrobromic acid at the reflux temperature of the system or constant boiling hydrochloric acid at 150° in a sealed vessel. In cases where hydrolysis to the acid without dealkylation is desired, a dilute solution ($<2.0$ N) of hydrochloric acid at the reflux temperature of the system for a length of time sufficient to go through the amide formation is preferred.

Although in the reaction of both the hydrolysis and dealkylation, the reflux temperature of the system is used, lower temperatures may be used. However, when temperatures much below 100° C. are used, the time of reaction will be considerably effected and amide compounds will be formed, and a reaction temperature will be reached which will require an extremely extended reaction time, thereby making this reaction impractical. Because of this condition, it is preferred to use reflux temperatures or temperatures fairly close to reflux. When one uses conditions between the above-mentioned extremes—low temperatures to reflux, dilute acid to concentrated acid—mixtures of the amide, acid, and dealkylated acid compound will be obtained.

The following examples are given by way of illustration.

EXAMPLE 1

Benzyl α-formamido-cyanoacetate

A solution of 0.5 mole of benzyl cyanoacetate, 217 ml. of ice water and (0.6 mole) sodium nitrite are stirred together at 3° C. while adding, over 35 minutes, 39.6 ml. (0.7 mole) glacial acetic acid. The reaction is stirred several hours while the ice melts and allowed to stand overnight. The crystalline mass is filtered and stirred with 250 ml. water and 42 ml. conc. HCl. The resulting mixture is extracted four times with ether, which after drying with $MgSO_4$, filtering and evaporating the solvent, yields crude crystalline α-oximinobenzyl cyanoacetate. This crude oximino compound is stirred in 290 ml. 88% formic acid at 60–63° C. while adding 54.5 g. zinc dust over 1:20 hours. After a short induction period, cooling is required. Reaction is continued for 20 minutes more, cooling is withdrawn, and after another 20 minutes the excess zinc is filtered and washed with three portions of hot ethyl acetate. The combined filtrates are aged several hours at room temperature, filtered again, and the solvents removed in vacuo, leaving a red oil which crystallizes. The product is washed twice with 1:1 chloroform-cyclohexane and twice with water, then taken up in ethylacetate, washed with saturated aqueous sodium bicarbonate, dried with magnesium sulfate, filtered, evaporated, and recrystallized from $CHCl_3$ (480 ml.)-cyclohexane (480 ml.) to yield 33.4 g. of α-formamido-benzyl cyanoacetate, 42.1%, M.P. 102–105° C.

Similarly, when acetic acid is used in place of formic acid, there is obtained benzyl-α-acetamido cyanoacetate.

When ethyl cyanoacetate, propyl cyanoacetate, pentyl cyanoacetate and phenylethyl cyanoacetate are used in place of benzyl cyanoacetate, there are obtained the ethyl, propyl, pentyl and phenylethyl formamido cyanoacetates respectively.

EXAMPLE 2

Ethyl acetamido cyanoacetate

A solution of 0.5 mole of ethyl cyanoacetate, 217 ml. of ice water and (0.6 mole) sodium nitrite are stirred together at 3° C. while adding, over 35 minutes, 39.6 ml. of (0.7 mole) glacial acetic acid. The reaction is stirred several hours while the ice melts and allowed to stand overnight. The crystalline mass is filtered and stirred with 250 ml. water and 42 ml. conc. HCl. The resulting mixture is extracted four times with ether, which after drying with $MgSO_4$, filtering and evaporating the solvent, yields crude crystalline α-oximinoethyl cyanoacetate. This crude oximino compound is stirred in 290 ml. 88% acetic acid at 60–63° C. while adding 54.5 g. zinc dust over 1:20 hours. After a short induction period, cooling is required. Reaction is continued for 20 minutes more, cooling is withdrawn, and after another 20 minutes the excess zinc is filtered and washed with three portions of hot ethyl acetate. The combined filtrates are aged several hours at room temperature, filtered again, and the solvents removed in vacuo. The product is washed twice with 1:1 chloroform-cyclohexane and twice with water, then taken up in ethyl acetate, washed with saturated aqueous sodium bicarbonate, dried with magnesium sulfate, filtered, evaporated, and recrystallized from $CHCl_3$ (480 ml.)-cyclohexane (480 ml.) to yield ethyl acetamido cyanoacetate.

When propyl cyanoacetate, pentyl cyanoacetate, benzyl cyanoacetate, and phenylethyl cyanoacetate are used in place of ethyl cyanoacetate, there are obtained propyl acetamido cyanoacetate, pentyl acetamido cyanoacetate, benzyl acetamido cyanoacetate and phenylethyl acetamido cyanoacetate respectively.

EXAMPLE 3

Ethyl-2-acetamido-2-(3,4-dimethoxybenzyl)-cyanoacetate

To a solution (7.20 g., 50% dispersion in mineral oil, 0.15 mole) of sodium hydride in 200 ml. of dimethyl formamide is added, with stirring and ice cooling, 0.15 mole of ethyl acetamido cyanoacetate. Hydrogen is evolved vigorously for a few minutes, and after ten minutes 0.15 mole of veratryl chloride is added. Stirring is continued overnight. Most of the solvent is then removed in vacuo, not exceeding a temperature of 37°. The residue is taken up in 250 ml. ethyl acetate and washed with 50 ml. water. The water layer is backwashed with ethyl acetate and filtered to break the emulsion. The combined ethyl acetate layers are washed six times with water and then dried with magnesium sulfate. After filtration and evaporation of the solvent, a clear glassy product (49.45 g.) is obtained which is finally crystallized from ethyl acetate-ether, 12.17 g., M.P. 102–104.5° C.

When veratryl-bromide is used in place of veratryl chloride, there is obtained ethyl 2-acetamido-2-(3,4-dimethoxybenzyl)-cyanoacetate.

When propyl acetamido cyanoacetate, pentyl acetamido cyanoacetate, phenylethyl acetamido cyanoacetate, and benzyl acetamido cyanoacetate are used in place of ethyl acetamido cyanoacetate, there are obtained propyl 2-acetamido-2-(3,4-dimethoxybenzyl)-cyanoacetate,
pentyl 2-acetamido-2-(3,4-dimethoxybenzyl)-cyanoacetate,
phenylethyl 2-acetamido-2-(3,4-dimethoxybenzyl)-cyanoacetate, and
benzyl 2-acetamido-2-(3,4-dimethoxybenzyl)-cyanoacetate respectively.

Similarly, when 3-methoxy-4-hydroxybenzyl chloride,
3-hydroxy-4-methoxybenzyl chloride,
3-ethoxy-4-hydroxybenzyl chloride, 3-hydroxy-4-ethoxybenzyl chloride,
3-butoxy-4-hydroxybenzyl chloride,
3-hydroxy-4-butoxybenzyl chloride,
3,4-dihydroxybenzyl chloride,
3,4-dipropoxybenzyl chloride,
3,4-dipentoxybenzyl chloride, and
3,4-methylenedioxybenzyl chloride are used in place of veratryl chloride, there are obtained ethyl 2-acetamido-2-(3-methoxy-4-hydroxybenzyl) cyanoacetate,
ethyl 2-acetamido-2-(3-hydroxy-4-methoxybenzyl) cyanoacetate,
ethyl 2-acetamido-2-(3-ethoxy-4-hydroxybenzyl) cyanoacetate,
ethyl 2-acetamido-2-(3-hydroxy-4-ethoxybenzyl) cyanoacetate,
ethyl 2-acetamido-2-(3-butoxy-4-hydroxybenzyl) cyanoacetate,
ethyl 2-acetamido-2-(3-hydroxy-4-butoxybenzyl) cyanoacetate,
ethyl 2-acetamido-2-(3,4-dihydroxybenzyl) cyanoacetate,
ethyl 2-acetamido-2-(3,4-dipropoxybenzyl) cyanoacetate,
ethyl 2-acetamido-2-(3,4-dipentoxybenzyl) cyanoacetate, and
ethyl 2-acetamido-2-(3,4-methylenedioxybenzyl) cyanoacetate,
respectively.

Similarly, when 4-methoxybenzyl chloride, 4-propoxybenzyl chloride, 4-hydroxybenzyl chloride, 3-methoxybenzyl chloride, 3-propoxybenzyl chloride, 3-hydroxybenzyl chloride, 2-methoxybenzyl chloride, 2-propoxybenzyl chloride, 2-hydroxybenzyl chloride, 5-ethoxybenzyl chloride and 6-methoxybenzyl chloride are used in place of veratryl chloride, there are obtained the corresponding ethyl 2-acetamido (substituted benzyl) cyanoacetates respectively.

Similarly, when ethyl formamido cyanoacetate is used in place of ethyl acetamido cyanoacetate and 3,4-dibenzyloxybenzyl chloride is used in place of veratryl chloride, in the above example, there is obtained ethyl 2-formamido-2-(3,4-dibenzyloxybenzyl) cyanoacetate.

EXAMPLE 4

2-acetamido-2-(3,4-dimethoxybenzyl)-3-hydroxypropionitrile

To a solution of 0.0377 mole of ethyl 2-acetamido-2-(3,4-dimethoxybenzyl) cyanoacetate in 100 ml. tetrahydrofuran is added, with stirring and ice cooling, 0.0415 mole of lithium borohydride. The reaction mixture is stirred 15 minutes in ice, 15 minutes at room temperature, and then refluxed for five hours. The solution is then distilled to remove the THF. To the resulting residue is added 200 ml. of water and sufficient dilute HCl (app. 3 N HCl) to neutralize the reaction mixture. The mixture is then extracted with 3× 100 ml. of ethyl acetate. The combined extracts are then stripped to yield 2-acetamido-2-(3,4-dimethoxy)-3-hydroxypropionitrile.

When sodium borohydride and potassium borohydride are used in place of lithium borohydride, there is obtained 2-acetamido-2-(3,4-dimethoxybenzyl)-3-hydroxypropionitrile. Similarly, when the ethyl 2-acetamido-2-(disubstituted benzyl) cyanoacetates [omitting the (3,4-dihydroxybenzyl) compound] and ethyl 2-acetamido-2-(monosubstituted benzyl) cyanoacetates obtained from Example 3 are used in place of ethyl 2-acetamido-2-(3,4-dimethoxybenzyl) cyanoacetate, there are obtained the corresponding 2-acetamido-2-(disubstituted benzyl) and (monosubstituted benzyl)-3-hydroxypropionitriles. When the 3,4-dihydroxybenzyl compound obtained from Example 3 is used, the 2-acetamido-2-(3,4-borate complex benzyl)-3-hydroxypropionitrile is obtained. Similarly, when ethyl 2-formamido-2-(3,4-dibenzyloxybenzyl) cyanoacetate obtained from Example 3 is used in place of ethyl 2-acetamido-2-(3,4-dimethoxybenzyl) cyanoacetate, in the above example, there is obtained 2-formamido-2-(3,4-dibenzyloxybenzyl)-3-hydroxypropionitrile. Similarly, when the propyl, pentyl, phenylethyl and benzyl 2-acetamido-2-(3,4-dimethoxybenzyl) cyanoacetates obtained from Example 3 are used in place of ethyl 2-acetamido-2-(3,4-dimethoxybenzyl) cyanoacetate, there is obtained 2-acetamido-2-(3,4-dimethoxybenzyl)-3-hydroxypropionitrile.

EXAMPLE 5

α-Hydroxymethyl-3,4-dihydroxyphenylalanine hydrobromide 0.0320 mole of 2-acetamido-2-(3,4-dimethoxybenzyl)-3-hydroxypropionitrile is refluxed under nitrogen with 140 ml. 48% HBr for 3½ hours. The volatiles are removed in vacuo. To this residue is added 100 mls. of water, and the water is subsequently removed under vacuo. The residue is then treated with (3× 100 ml.) t-butanol, which is then removed under vacuo. To the residue is added 100 ml. of dry acetone and the ammonium bromide is filtered. The acetone is removed under vacuo to obtain α-hydroxymethyl-3,4 - dihydroxyphenylalanine hydrobromide. Similarly, when the 2-acetamido-2-(disubstituted benzyl) and (monosubstituted benzyl)-3-hydroxypropionitriles (including the 3,4-borate complex compound, in which case the borate is hydrolyzed to the 3,4-dihydroxy compound) obtained from Example 4 are used in place of 2-acetamido-2-(3,4 - dimethoxybenzyl)-3-hydroxypropionitrile, there are obtained the corresponding α-hydroxymethyl-dihydroxyphenyl (monohydroxyphenyl) and 3,4-methylenedioxyphenylalanine hydrobromides.

EXAMPLE 6

α-hydroxymethyl-3,4-dihydroxyphenylalanine

To a solution of 27 g. of α-hydroxymethyl-3,4-dihydroxyphenylalanine hydrobromine in 250 ml. of secondary butanol is added 10 ml. of propylene oxide. The mixture is aged at 25° for 5 hours and the precipitated amino acid is filtered, washed with secondary butanol and dried in vacuo to yield α-hydroxymethyl-3,4-dihydroxyphenylalanine.

When the α-hydroxymethyl (dihydroxyphenyl) and (monohydroxyphenyl) alanine hydrobromides obtained from Example 5 are used in place of α-hydroxymethyl-3,4-dihydroxyphenylalanine hydrobromide in the above example, there are obtained the corresponding α-hydroxymethyl (dihydroxyphenyl) and (monohydroxyphenyl) alanines. When using α-hydroxymethyl-3,4-methylenedioxyphenylalanine hydrobromide, there is obtained α-hydroxymethyl-3,4-methylenedioxyphenylalanine.

EXAMPLE 7

α-Hydroxymethyl-3,4-dimethoxyphenylalanine hydrochloride 0.0377 mole of 2-acetamido-2-(3,4-dimethoxybenzyl)-3-hydroxypropionitrile is stirred under nitrogen in 140 ml. of H₂O and 0.083 mole HCl for 3 hours at the reflux temperature of the system. The volatiles are removed in vacuo. To this residue is added 100 ml. of water, and the water is subsequently removed under vacuo. The residue is then treated with (2× 100 ml.) t-butanol, which is then removed under vacuo. To the residue is added 100 ml. of dry acetone and the ammonium chloride is filtered. The acetone is removed under vacuo to obtain α-hydroxymethyl-3,4-dimethoxyphenylalanine hydrochloride. When the 2-acetamido-2-(disubstituted benzyl) and (monosubstituted benzyl)-3-hydroxypropionitriles obtained from Example 4 are used in place of 2-acetamido-2-(3,4-dimethoxybenzyl) - 3 - hydroxypropionitrile, there are obtained the corresponding α-hydroxymethyl-(disubstituted phenyl) and (monosubstituted phenyl) alanine hydrochlorides.

EXAMPLE 8

α-Hydroxymethyl-3,4-dimethoxyphenylalanine

To a solution of 25.5 g. of α-hydroxymethyl-3,4-dimethoxyphenylalanine hydrochloride in 250 ml. of secondary butanol is added 10 ml. of propylene oxide. The mixture is aged at 25° for 5 hours and the precipitated amino acid is filtered, washed with secondary butanol and dried in vacuo to yield α-hydroxymethyl-3,4-dimethoxyphenylalanine.

When the α-hydroxymethyl (disubstituted phenyl) and (monosubstituted phenyl) alanine hydrochlorides obtained from Example 7 are used in place of α-hydroxymethyl-3,4-dimethoxyphenylalanine hydrochloride in the above example, there are obtained the corresponding α-hydroxymethyl (disubstituted phenyl) and (monosubstituted phenyl) alanines. When using α-hydroxymethyl-3,4-methylenedioxyphenylalanine hydrochloride, there is obtained α-hydroxymethyl-3,4-methylenedioxyphenylalanine.

EXAMPLE 9

α-Hydroxymethyl-3,4-dihydroxyphenylalanine hydrochloride 0.0377 mole of α-hydroxymethyl-3,4-dimethoxyphenylalanine hydrochloride is heated at 150° in a sealed tube with 140 ml. of 35% hydrochloride acid for 2 hours. The volatiles are removed in vacuo. To this residue is added 100 ml. of water, and the water is subsequently removed under vacuo. The residue is washed with (3 × 100 ml.) of t-butanol, and the solution is then concentrated under vacuo to obtain α-hydroxymethyl-3,4-dihydroxyphenylalanine hydrochloride. When the α-hydroxymethyl-(disubstituted phenyl) and (monosubstituted phenyl) alanine hydrochlorides obtained from Example 7 are used in place of α-hydroxymethyl-3,4-dimethoxyphenylalanine hydrochloride in the above example, there is obtained the corresponding α-hydroxymethyl-(dihydroxyphenyl) and (monohydroxyphenyl) alanine hydrochloride.

EXAMPLE 10

Ethyl-α-hydroxymethyl-3,4-dihydroxyphenylalanine ester hydrochloride

To a solution of 0.010 mole of α-hydroxymethyl-3,4-dihydroxyphenylalanine in 100 ml. of ethanol is added an excess of hydrochloric acid gas. The solution is refluxed for 3 hours whereupon the solution is distilled until the solution becomes a heavy slurry. The mixture is then cooled to 5° C., filtered, and the solids washed with 2 × 150 ml. of cold ethanol to yield ethyl-α-hydroxymethyl-3, 4-dihydroxyphenylalanine ester hydrochloride. When methanol or butanol is used in place of ethanol there is obtained the corresponding methyl or butyl ester.

EXAMPLE 11

α-Hydroxymethyl-3,4-dimethoxyphenylalanine amide·HCl

To a solution of 0.010 mole of 2-formamido-2-(3,4-dimethoxybenzyl)-3-hydroxypropionitrile in 100 ml. of methanol is added a solution of 0.011 mole of 3 N methanolic hydrochloric acid and the solution is stirred at room temperature for 15 minutes. The solution is then concentrated in vacuo to a heavy syrup. The syrup is then diluted with 200 ml. of water and refluxed for 15 minutes. The mixture is then cooled to 5° and filtered to obtain α-hydroxymethyl-3,4-dimethoxyphenylalanine amide·HCl.

EXAMPLE 12

α-Hydroxymethyl-3,4-dihydroxyphenylalanine·HBr

The procedure of Example 5 is followed, using α-hydroxymethyl-3,4-dimethoxyphenylalanine amide·HCl in place of 2-acetamido-2-(3,4-dimethoxybenzyl)-3-hydroxypropionitrile to obtain α-hydroxymethyl-3,4-dihydroxyphenylalanine·HBr.

EXAMPLE 13

α-Hydroxymethyl-3,4-dihydroxyphenylalanine amide hydrochloride

When the procedure of Example 11 is followed using 2-formamido-2-(3,4-dibenzyloxybenzyl)-3 - hydroxypropionitrile in place of 2-formamido-2-(3,4-dimethoxyphenyl)-3-hydroxypropionitrile, there is obtained α-hydroxymethyl-3,4-benzyloxyphenylalanine amide hydrochloride. This benzyloxy compound is then mixed with 150 ml. of methanol and shaken with 3g. of palladium on charcoal and hydrogen until the hydrogen uptake ceases. The catalyst is filtered and the filtrate is concentrated to dryness in vacuo to yield the α-hydroxymethyl-3,4-dihydroxyphenylalanine amide hydrochloride.

What is claimed is:
1. A compound of the formula
in which $R_3$ is selected from the group consisting of acetyl

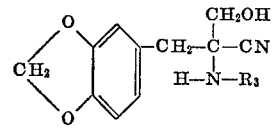

and formyl.

References Cited

UNITED STATES PATENTS 3,366,679    1/1968    Reinhold et al. \_\_ 260—465 D X
3,401,178    9/1968    Firestone et al. \_\_\_\_ 260—340.5

NICHOLAS S. RIZZO, Primary Examiner

U.S. Cl. X.R.

260—465 E, 471 A, 519, 559 A, 599, 600, 613 D, 621 K; 424—282